United States Patent
Li et al.

(10) Patent No.: US 12,230,171 B2
(45) Date of Patent: Feb. 18, 2025

(54) IMAGING SYSTEM AND CONTROL METHOD THEREFOR, AND CONTROL APPARATUS AND NON-TRANSITORY COMPUTER-READABLE STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xi Li, Beijing (CN); Jinbao Peng, Beijing (CN); Wenyu Li, Beijing (CN); Longhui Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 28 days.

(21) Appl. No.: 17/782,464

(22) PCT Filed: May 14, 2021

(86) PCT No.: PCT/CN2021/093749
§ 371 (c)(1),
(2) Date: Jun. 3, 2022

(87) PCT Pub. No.: WO2021/249111
PCT Pub. Date: Dec. 16, 2021

(65) Prior Publication Data
US 2023/0005398 A1    Jan. 5, 2023

(30) Foreign Application Priority Data

Jun. 8, 2020 (CN) .......................... 202010514327.6

(51) Int. Cl.
  G09G 3/00     (2006.01)
  G02B 7/02     (2021.01)
(52) U.S. Cl.
  CPC ............. *G09G 3/001* (2013.01); *G02B 7/023* (2013.01); *G09G 2320/041* (2013.01);
  (Continued)
(58) Field of Classification Search
  None
  See application file for complete search history.

(56) References Cited

U.S. PATENT DOCUMENTS 9,569,815 B1    2/2017  Abuelsaad et al.
2009/0244066 A1*  10/2009  Sugita ................. H04N 13/282
                                                345/427

(Continued)

FOREIGN PATENT DOCUMENTS

CN   102682744 A   9/2012
CN   105139791 A   12/2015

(Continued)

OTHER PUBLICATIONS

First Office Action issued by the Chinese Patent Office for Application No. 202010514327.6 on Aug. 18, 2021.

(Continued)

*Primary Examiner* — Andre L Matthews
(74) *Attorney, Agent, or Firm* — IP & T GROUP LLP

(57) ABSTRACT

A control method for an imaging system is provided. The imaging system includes a display device and a dimming lens disposed on a display side of the display device. The dimming lens is capable of moving toward or away from the display apparatus to adjust an object distance from the display device to the dimming lens. The control method includes: determining the object distance when the dimming lens moves to a set position; according to the object distance, (Continued)

determining an image distance from a virtual image, generated by a display image of the display device through the dimming lens, to the dimming lens; and according to the determined image distance and a correlation between the image distance and a resolution of the display image, determining a resolution corresponding to the determined image distance, and controlling the display device to display the display image at the determined resolution.

18 Claims, 8 Drawing Sheets

(52) U.S. Cl.
CPC ............... *G09G 2330/021* (2013.01); *G09G 2340/0407* (2013.01); *G09G 2354/00* (2013.01)

(56) References Cited

U.S. PATENT DOCUMENTS

| | | | | |
|---|---|---|---|---|
| 2012/0147038 A1* | 6/2012 | Perez | ............... | G02B 27/0172 345/632 |
| 2012/0262477 A1 | 10/2012 | Buchheit | | |
| 2014/0118240 A1 | 5/2014 | Pais | | |
| 2017/0200427 A1 | 7/2017 | He et al. | | |
| 2017/0293145 A1* | 10/2017 | Miller | ............... | G02B 27/0172 |
| 2018/0095528 A1* | 4/2018 | Tao | ............... | G06F 3/012 |
| 2019/0027118 A1* | 1/2019 | Zuo | ............... | G06F 3/147 |
| 2021/0030270 A1* | 2/2021 | Goyal | ............... | G02B 27/0172 |
| 2021/0173474 A1* | 6/2021 | Sztuk | ............... | G06T 19/006 |

FOREIGN PATENT DOCUMENTS

| | | |
|---|---|---|
| CN | 105911694 A | 8/2016 |
| CN | 105929534 A | 9/2016 |
| CN | 105955477 A | 9/2016 |
| CN | 106597669 A | 4/2017 |
| CN | 107037957 A | 8/2017 |
| CN | 107465815 A | 12/2017 |
| CN | 110166758 A | 8/2019 |
| CN | 111240612 A | 6/2020 |
| CN | 111629198 A | 9/2020 |

OTHER PUBLICATIONS

Second office Action Issued by the Chinese Patent Office for Application No. 202010514327.6 on Jan. 19, 2022.

* cited by examiner

100

100

IMAGING SYSTEM AND CONTROL METHOD THEREFOR, AND CONTROL APPARATUS AND NON-TRANSITORY COMPUTER-READABLE STORAGE MEDIUM

CROSS-REFERENCE TO RELATED APPLICATIONS

The present disclosure is a national phase entry under 35 USC 371 of International Patent Application No. PCT/CN2021/093749, filed on May 14, 2021, which claims priority to Chinese Patent Application No. 202010514327.6, filed on Jun. 8, 2020, which are incorporated herein by reference in their entirety.

TECHNICAL FIELD

Embodiments of the present disclosure relate to an imaging system, a control method therefor, a control device, and a non-transitory computer-readable storage medium.

BACKGROUND

With the development of virtual reality technology, more and more virtual reality (VR) display devices have entered people's lives.

SUMMARY

In one aspect, a control method for an imaging system is provided. The imaging system includes a display device and a dimming lens disposed on a display side of the display device, and the dimming lens is capable of moving toward or away from the display device to adjust an object distance from the display device to the dimming lens. The control method includes: determining the object distance when the dimming lens moves to a set position; according to the object distance, determining an image distance from a virtual image, generated by a display image of the display device through the dimming lens to the dimming lens; and according to the determined image distance and a correlation between the image distance and a resolution of the display image, determining a resolution corresponding to the determined image distance, and controlling the display device to display the display image at the determined resolution.

In some embodiments, the image distance has a negative correlation with the resolution of the display image.

In some embodiments, according to the determined image distance and the correlation between the image distance and the resolution of the display image, determining the resolution corresponding to the determined image distance, includes: if the determined image distance is within a first image distance range, determining that the resolution corresponding to the determined image distance is equal to a screen resolution of the display device; and if the determined image distance is within a second image distance range, determining that the resolution corresponding to the determined image distance is smaller than the screen resolution of the display device. Each image distance value in the second image distance range is greater than each image distance value in the first image distance range.

In some embodiments, each image distance value in the first image distance range is greater than or equal to 0.1 meters and less than or equal to 3 meters.

In some embodiments, the second image distance range includes a third image distance range and a fourth image distance range; according to the determined image distance and the correlation between the image distance and the resolution of the display image, determining the resolution corresponding to the determined image distance, further includes: if the determined image distance is within the third image distance range, determining that the resolution corresponding to the determined image distance is a first resolution; and if the determined image distance is within the fourth image distance range, determining that the resolution corresponding to the determined image distance is a second resolution. Each image distance value in the fourth image distance range is greater than each image distance value in the third image distance range; the first resolution is smaller than the screen resolution of the display device and larger than the second resolution; a number of horizontal pixels of the second resolution is 0.5 times a number of horizontal pixels of the screen resolution of the display device, and a number of vertical pixels of the second resolution is 0.5 times a number of vertical pixels of the screen resolution of the display device.

In some embodiments, each image distance value in the third image distance range is greater than 3 meters and less than or equal to 6 meters; each image distance value in the fourth image distance range is greater than 6 meters and less than or equal to 10 meters.

In some embodiments, the screen resolution of the display device is 1200×1200; the first resolution is 800×800; the second resolution is 600×600.

In some embodiments, the imaging system further includes a driving component connected to the dimming lens, and the driving component is configured to drive the dimming lens to move toward or away from the display device; determining the object distance when the dimming lens moves to the set position, includes: according to a state change amount of the driving component, determining a moving direction and a moving distance of the dimming lens when the dimming lens moves from an initial position to the set position; and according to an object distance when the dimming lens is located at the initial position, and the moving direction and the moving distance of the dimming lens when the dimming lens moves from the initial position to the set position, determining the object distance when the dimming lens is located at the set position.

In some embodiments, the driving component includes a driving shaft; the state change amount of the driving component includes a rotation direction and a number of rotations of the driving shaft.

In some embodiments, according to the object distance, determining the image distance from the virtual image, generated by the display image of the display device through the dimming lens, to the dimming lens, includes:

determining the image distance according to following formula:

$$\frac{1}{a} - \frac{1}{b} = \frac{1}{f};$$

wherein a is the object distance, b is the image distance, f is a focal distance of the dimming lens, and a is less than f.

In some embodiments, the imaging system further includes an information acquisition device, and the information acquisition device is configured to acquire identity information of a user; the control method further includes: determining whether the identity information of the user acquired by the information acquisition device appears for a first time; if the acquired identity information of the user appears for the first time, storing the identity information of the user, a set position corresponding to the identity information of the user, and a resolution corresponding to the identity information of the user.

In some embodiments, if the acquired identity information of the user does not appear for the first time, obtaining the set position corresponding to the identity information of the user and the resolution corresponding to the identity information of the user, and controlling the dimming lens to move to the set position corresponding to the identity information of the user, and controlling the display device to display the display image at the resolution corresponding to the identity information of the user.

In another aspect, a control device of an imaging system is provided. The imaging system includes a display device and a dimming lens disposed on a display side of the display device, and the dimming lens is capable of moving toward or away from the display device to adjust an object distance from the display device to the dimming lens. The control device includes: an object distance determination module configured to determine the object distance when the dimming lens moves to a set position; an image distance determination module configured to determine an image distance from a virtual image, generated by a display image of the display device through the dimming lens, to the dimming lens according to the object distance; a resolution determination module configured to determine a resolution corresponding to the calculated image distance according to the calculated image distance and a correlation between the image distance and a resolution of the display image; and a display control module configured to control the display device to display the display image at the determined resolution.

In some embodiments, the imaging system further includes a driving component connected to the dimming lens, and the driving component is configured to drive the dimming lens to move toward or away from the dimming lens. The object distance determination module includes: a first determination module configured to determine a moving direction and a moving distance of the dimming lens when the dimming lens moves from an initial position to the set position according to a state change amount of the driving component; and a second determination module configured to determine the object distance when the dimming lens is located at the set position according to an object distance when the dimming lens is located at the initial position and the moving direction and the moving distance of the dimming lens when the dimming lens moves from the initial position to the set position.

In some embodiments, the imaging system further includes an information acquisition device, and the information acquisition device is configured to acquire identity information of a user. The control device further includes a determining module, a storage module, an obtaining module and a display control module. The determining module is configured to determine whether the acquired identity information of the user appears for a first time; if the acquired identity information of the user appears for the first time, the storage module stores the identity information of the user, a set position corresponding to the identity information of the user, and a resolution corresponding to the identity information of the user; if the acquired identity information of the user does not appear for the first time, the obtaining module obtains the set position corresponding to the identity information of the user and the resolution corresponding to the identity information of the user, and the display control module controls the dimming lens to move to the set position corresponding to the identity information of the user, and controls the display device to display the display image at the resolution corresponding to the identity information of the user.

In yet another aspect, an imaging system is provided. The imaging system includes: a display device; a dimming lens disposed on a display side of the display device, the dimming lens being capable of moving toward or away from the display device to adjust an object distance from the display device to the dimming lens; and a control device. The control device is configured to: determine the object distance when the dimming lens moves to a set position; according to the object distance, determine an image distance from a virtual image, generated by a display image of the display device through the dimming lens, to the dimming lens; according to the determined image distance and a correlation between the image distance and a resolution of the display image, determine a resolution corresponding to the determined image distance; and control the display device to display the display image at the determined resolution.

In some embodiments, the imaging system further includes: a driving component connected to the dimming lens. The driving member is configured to drive the dimming lens to move toward or away from the display device. The control device is further configured to: determine a moving direction and a moving distance of the dimming lens when the dimming lens moves from an initial position to the set position, according to a state change amount of the driving component; and determine the object distance when the dimming lens is located at the set position, according to an object distance when the dimming lens is located at the initial position and the moving direction and the moving distance of the dimming lens when the dimming lens moves from the initial position to the set position.

In some embodiments, the imaging system further includes: an information acquisition device configured to acquire identity information of a user. The control device is further configured to determine whether the acquired identity information of the user appears for a first time; if the acquired identity information of the user appears for the first time, the control device is further configured to store the identity information of the user, a set position corresponding to the identity information of the user, and a resolution corresponding to the identity information of the user; if the acquired identity information of the user does not appear for the first time, the control device is further configured to: obtain the set position corresponding to the identity information of the user and the resolution corresponding to the identity information of the user; control the dimming lens to move to the set position corresponding to the identity information of the user; and control the display device to display the display image at the resolution corresponding to the identity information of the user.

In some embodiments, the imaging system is a virtual reality (VR) all-in-one machine, a VR vision correction device or VR glasses.

In yet another aspect, a non-transitory computer-readable storage medium is provided. The computer-readable storage medium stores computer program instructions that, when executed on a processor, cause the processor to perform one or more steps of the control method for the imaging system according to any one of the above embodiments.

In yet another aspect, a computer program product is provided. The computer program product includes computer program instructions that, when executed on a computer, cause the computer to perform one or more steps of the control method for the imaging system according to any one of the above embodiments.

In yet another aspect, a computer program is provided. When the computer program is executed on a computer, the computer program causes the computer to perform one or more steps of the control method for the imaging system according to any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
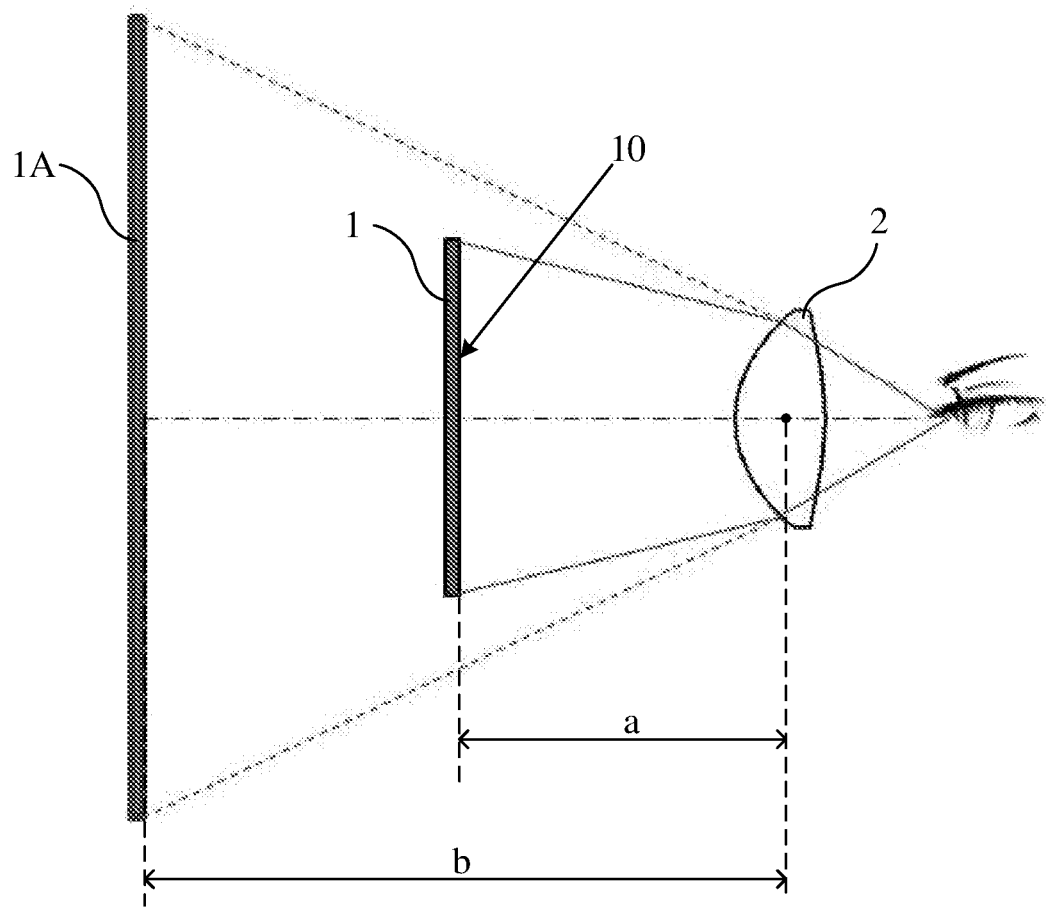
FIG. 1 is a diagram showing an imaging principle of an imaging system, in accordance with some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive sense, i.e., "including, but not limited to". In the description of the specification, terms such as "one embodiment", "some embodiments", "exemplary embodiments", "an example", "a specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying relative importance or implicitly indicating the number of indicated technical features. Thus, a feature defined by the term such as "first" or "second" may explicitly or implicitly include one or more of the features. In the description of the embodiments of the present disclosure, the term "a plurality of or the plurality of" means two or more unless otherwise specified.

In the description of some embodiments, terms such as "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is, optionally, construed as "when" or "upon" or "in response to determining" or "in response to detecting", depending on the context. Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The use of the phase "applicable to" or "configured to" herein means an open and inclusive language, which does not exclude devices that are applicable to or configured to perform additional tasks or steps.

Additionally, the use of the phase "based on" is meant to be open and inclusive, since a process, step, calculation or other action that is "based on" one or more of the stated conditions or values may, in practice, be based on additional conditions or value beyond those stated.

A virtual reality (VR) all-in-one machine is a VR head-mounted display device having an application processor (AP). The VR all-in-one machine has functions of independent computing, inputting and outputting. Although the functions of the VR all-in-one machine are not as powerful as those of an external VR head-mounted display device, the VR all-in-one machine has no constraints with connection lines and has a higher degree of freedom.

In the related art, in order to achieve a good display effect of the VR all-in-one machine, a display is continuously performed in a high-resolution and a high-frame rate manner. However, performance of the application processor in the VR all-in-one machine is usually weak; during image rendering and calculation, the application processor has a high load and generates heat seriously, which will cause an overall temperature of the machine to be too high. In a case where the temperature exceeds a certain limit, the application processor will automatically reduce frequency to run, and reduce an image refresh rate in turn, thereby causing an image to freeze and reducing an experience effect.

For example, VR vision correction devices belong in a category of VR all-in-one machines, and an application processor in a VR vision correction device is often in a high load operation state for a long time. As a result, an overall temperature and a display frame rate of the VR vision correction device are unstable, and a user experience effect is very poor; furthermore, the VR vision correction device may only be used for one to three hours after being fully charged, and power consumption is very fast.

Based on this, some embodiments of the present disclosure provide an imaging system, a control method thereof, a control device and a storage medium that having at least the following technical effects. First, it is possible to ameliorate problems of excessive rendering pressure and serious heating of an application processor in the imaging system. Second, it is possible to ameliorate problems of fast power consumption and short usage time of a battery. Third, there are no obvious differences in a display effect compared with traditional solutions. The imaging system may be the VR all-in-one machine, the VR vision correction device, or VR glasses. The imaging system and the control method thereof, the control device and the storage medium will be described in detail below with reference to the accompanying drawings.

FIG. 1 is a diagram showing an imaging principle of an imaging system, in accordance with some embodiments of the present disclosure. As shown in FIG. 1, the imaging system 100 includes a display device 1 and a dimming lens 2 disposed on a display side 10 of the display device 1.

The display device 1 may display images such as pictures and videos. For example, the display device may be a liquid crystal display device, an organic light emitting diode display device, a projection display device, or the like. The embodiments of the present disclosure do not limit a type of the display device, that is, the display device 1 may be any device having a display function.

The dimming lens 2 may move toward or away from the display device 1 to adjust an object distance a from the display device 1 to the dimming lens 2. A position of the dimming lens 2 may be adjusted manually or automatically. In a case where the position of the dimming lens 2 is adjusted manually, a manual adjustment structure connected to the dimming lens 2 may be pushed or rotated by a human hand, so that the dimming lens 2 is driven to move toward or away from the display device 1 by the manual adjustment structure. In a case where the position of the dimming lens 2 is adjusted automatically, for example, the imaging system further includes a driving member (e.g., a motor) connected to the dimming lens 2, and the driving member may drive the dimming lens 2 to move toward or away from the display device 1 automatically. It will be understood that the above is only an example, and a method for controlling the dimming lens 2 to move toward or away from the display device 1 in the present disclosure is not limited thereto.

Figure 2:
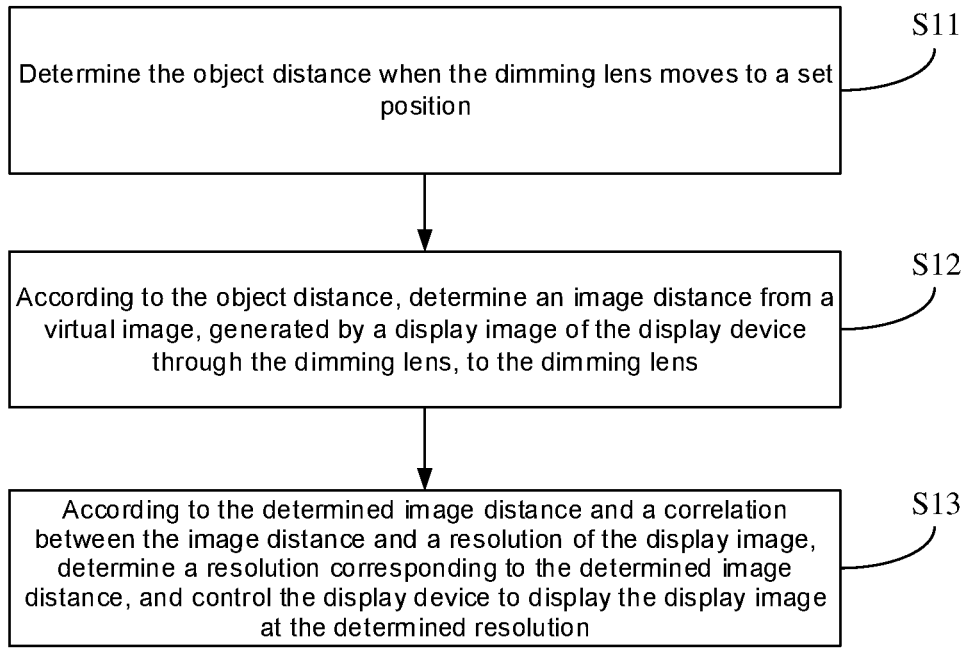
FIG. 2 is a flow diagram of a control method for an imaging system, in accordance with some embodiments of the present disclosure.

On this basis, a control method for an imaging system provided in some embodiments of the present disclosure is shown in FIG. 2. As shown in FIG. 2, the control method includes S11 to S13.

In S11, when the dimming lens 2 moves to a set position, the object distance a is determined.

Referring to FIG. 1, the set position refers to a position where the dimming lens 2 is located when a user may view a clear image (i.e., a clear virtual image 1A in FIG. 1) through the dimming lens 2. It will be understood that image distances b are not the same when users with different vision view a clear image. In other words, the image distance when a user with good vision views a clear image is greater than the image distance when a user with poor vision views a clear image. Moreover, in a case where a focal distance of the dimming lens 2 is constant, since the image distances b are not the same when users with different vision view a clear image, the object distances a corresponding to users with different vision are also different, that is, set positions corresponding to the users with different vision are not the same. Based on this, by the above S11, when the different users each move the dimming lens 2 to a respective set position, a respective object distance a may be determined.

In S12, according to the object distance a, the image distance b from the virtual image 1A, generated by a display image of the display device 1 through the dimming lens 2, to the dimming lens 2 is determined.

For example, the image distance b may be determined according to the following formula:

$$\frac{1}{a} - \frac{1}{b} = \frac{1}{f};$$

where a is the object distance, b is the image distance, f is the focal distance of the dimming lens, and a is less than f (a<f). Referring to FIG. 1, the object distance a is set to be less than the focal distance f, so that the virtual image 1A and the display device 1 are located on the same side of the dimming lens 2, and in this case, a user may view the virtual image 1A corresponding to the display image of the display device 1 through the dimming lens 2 from a side of the dimming lens 2 away from the display device 1. The virtual image 1A is an upright enlarged display image.

In S13, according to the determined image distance b and a correlation between the image distance and a resolution of the display image, a resolution corresponding to the calculated image distance b is determined, and the display device 1 is controlled to display the display image at the determined resolution.

The correlation between the image distance and the resolution of the display image means that, for any calculated image distance b, there is a resolution of the display image corresponding to the image distance b. For example, different image distances b may correspond to different resolution respectively; or, a group of image distances b (e.g., a plurality of image distances b in the same value range) may correspond to a same resolution, and in this case, a plurality of groups of image distances b correspond to different resolution respectively.

In addition, the correlation between the image distance and the resolution of the display image may be pre-stored in an internal memory of the imaging system, or may be pre-stored in an external memory coupled to the imaging system. Moreover, a storage manner for pre-storing the correspondence relationship is not limited here.

By S11 to S13 in the above control method, for different users, the object distances and the image distances corresponding to when the different users view the clear virtual image 1A may be determined respectively, and different display image resolution may be provided according to the different image distances, which is beneficial to prevent the application processor in the imaging system from running at a high load for a long time. As a result, the problems of excessive image rendering pressure and serious heat generation of the application processor are ameliorated, and the problems of fast power consumption and short usage time of the battery in the imaging system are ameliorated. Moreover, compared with the traditional solutions, the imaging system has no obvious differences in the display effect.

It is worth noting that, when the human eye views objects, the closer objects are larger, and the farther objects are smaller. Therefore, even if a high-definition display image is rendered, the display image may have effects of stretching and enlarging in a case where the image distance is large. That is to say, even if the resolution of the display image displayed by the display device is high, in the case where the image distance is large, it is difficult for the human eye to view the virtual image as clear as the display image. Therefore, in this case, unnecessary image rendering pressure may be caused to the application processor in the imaging system. Especially for the VR vision correction device, since the VR vision correction device needs to adjust the image distance of the virtual image frequently, if a display is always performed at the resolution of the display device, a burden on the application processor may be increased undoubtedly, and a good display effect may not be achieved in a case where the image distance is far away. As a result, problems such as serious heat generation and fast power consumption are prone to occur.

Based on this, in some embodiments, the image distance has a negative correlation with the resolution of the display image. With this design, the resolution of the display image decreases as the image distance increases, thereby reducing the image rendering pressure of the application processor in the imaging system in a case where the image distance is large, and preventing the application processor from running at the high load for a long time, so as to ameliorate problems such as serious heat generation and fast power consumption of the application processor and the entire imaging system. As a result, it is not easy for the application processor to automatically reduce frequency to run due to the serious heat generation, and it is not easy for the imaging system to have problems such as a reduction in an image refresh rate and an image freeze.

Figure 3:
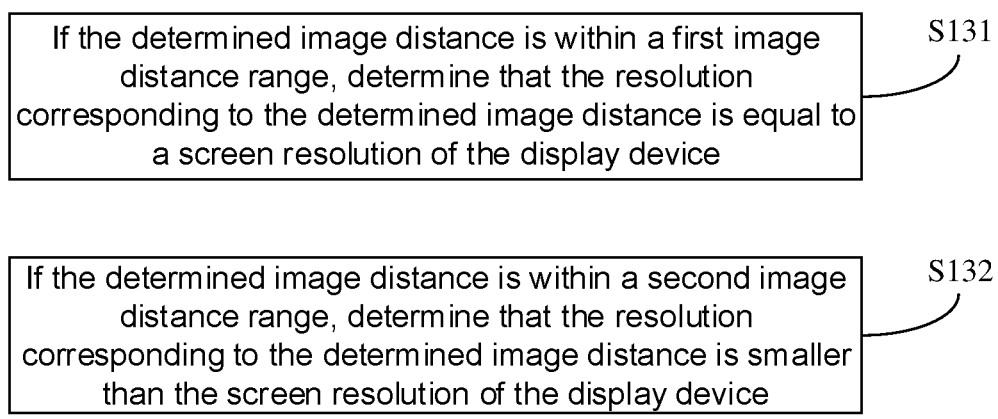
FIG. 3 is a flow diagram of another control method for an imaging system, in accordance with some embodiments of the present disclosure.

In some other embodiments, as shown in FIG. 3, S13 includes S131 and S132.

In S131, if the determined image distance b is within a first image distance range, it is determined that the resolution corresponding to the determined image distance b is equal to a screen resolution of the display device.

In S132, if the determined image distance b is within a second image distance range, it is determined that the resolution corresponding to the determined image distance b is smaller than the screen resolution of the display device. Each image distance value in the second image distance range is greater than each image distance value in the first image distance range.

In the embodiments, if the determined image distance b is within the first image distance range, it means that a distance between the virtual image and the human eye is relatively small. In this case, the determined resolution corresponding to the determined image distance b is equal to the screen resolution of the display device. That is, in this case, the display device displays the display image at a resolution equal to the screen resolution thereof, so that the human eye may view a clear virtual image. If the determined image distance b is within the second image distance range, it means that the distance between the virtual image and the human eye is relatively large. In this case, the determined resolution corresponding to the determined image distance b is smaller than the screen resolution of the display device. That is, in this case, the display device displays the display image at a resolution smaller than the screen resolution thereof, in this way, it is possible to reduce the image rendering pressure of the application processor in the imaging system, and prevent the application processor from running at a high load for a long time, so as to ameliorate problems such as serious heat generation and fast power consumption of the application processor and the entire imaging system. As a result, it is not easy for the application processor to automatically reduce frequency to run due to the serious heat generation, and it is not easy for the imaging system to have problems such as a reduction in an image refresh rate and an image freeze.

Based on this, for example, each image distance value in the first image distance range is greater than or equal to 0.1 meters and less than or equal to 3 meters. With this design, the display device displays the display image at the resolution equal to the screen resolution of the display device in a case where the determined image distance b is greater than or equal to 0.1 meters and less than or equal to 3 meters, so that the human eye may view a clear virtual image.

Figure 4:
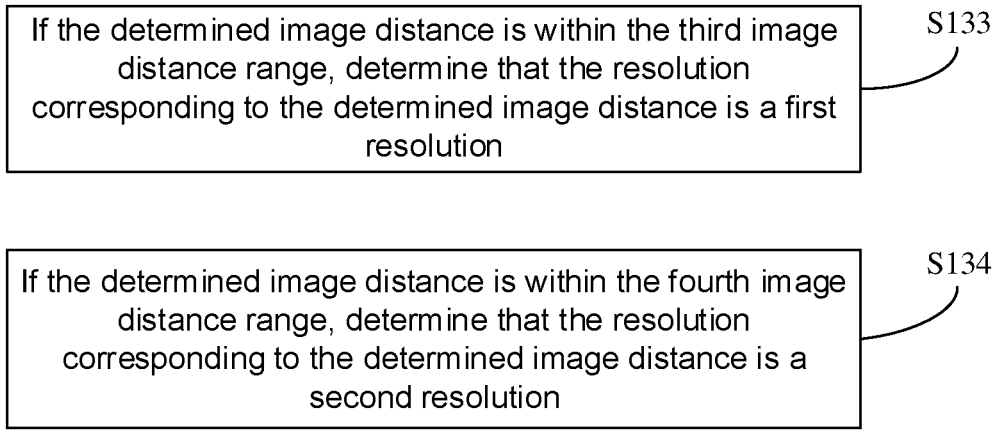
FIG. 4 is a flow diagram of yet another control method for an imaging system, in accordance with some embodiments of the present disclosure.

In a case where the second image distance range includes a third image distance range and a fourth image distance range, for example, as shown in FIG. 4, the S13 further includes S133 and S134.

In S133, if the determined image distance is within the third image distance range, it is determined that the resolution corresponding to the determined image distance is a first resolution.

In S134, if the determined image distance is within the fourth image distance range, it is determined that the resolution corresponding to the determined image distance is a second resolution.

Each image distance value in the fourth image distance range is greater than each image distance value in the third image distance range. The first resolution is smaller than the screen resolution of the display device and larger than the second resolution. The number of horizontal pixels of the second resolution is 0.5 times the number of horizontal pixels of the screen resolution of the display device, and the number of vertical pixels of the second resolution is 0.5 times the number of vertical pixels of the screen resolution of the display device. In other words, the second resolution is a quarter of the screen resolution of the display device.

In the embodiments, if the determined image distance b is within the third image distance range, it means that the distance between the virtual image and the human eye is relatively large. In this case, the determined resolution corresponding to the determined image distance b is the first resolution. That is, in this case, the display device displays the display image at the first resolution smaller than the screen resolution of the display device and larger than the second resolution, in this way, it is possible to reduce the image rendering pressure of the application processor in the imaging system and prevent the application processor from running at a high load for a long time, so as to ameliorate problems of serious heat generation and fast power consumption of the application processor and the entire imaging system. As a result, it is not easy for the application processor to automatically reduce frequency to run due to the serious heat generation, and it is not easy for the imaging system to have problems such as a reduction in an image refresh rate and an image freeze.

However, if the determined image distance b is within the fourth image distance range, it means that the distance between the virtual image and the human eye is large. In this case, the determined resolution corresponding to the determined image distance b is the second resolution. That is, in this case, the display device displays the display image at the second resolution smaller than the first resolution, in this way, it is possible to further reduce the image rendering pressure of the application processor in the imaging system and prevent the application processor from running at a high load for a long time, so as to further ameliorate problems of serious heat generation and fast power consumption of the application processor and the entire imaging system. As a result, it is more difficult for the application processor to automatically reduce frequency to run due to the serious heat generation, and it is more difficult for the imaging system to have problems such as a reduction in an image refresh rate and an image freeze in this case.

On this basis, for example, each image distance value in the third image distance range is greater than 3 meters and less than or equal to 6 meters, and each image distance value in the fourth image distance range is greater than 6 meters and less than or equal to 10 meters.

With this design, in a case where the determined image distance b is greater than 3 meters and less than or equal to 6 meters (i.e., within the third image distance range), the display device displays the display image at the first resolution smaller than the screen resolution and larger than the second resolution. In this case, not only may the image rendering pressure of an independent system in the imaging system be reduced, but also the virtual image viewed by the human eye and the viewed virtual image at the same image distance in the related art have no obvious differences in the display effect.

Similarly, with this design, in a case where the determined image distance b is greater than 6 meters and less than or equal to 10 meters (i.e., within the fourth image distance range), the display device displays the display image at the second resolution smaller than the first resolution. In this case, not only may the image rendering pressure of the independent system in the imaging system be further reduced, but also the virtual image viewed by the human eye and the viewed virtual image at the same image distance in the related art have no obvious differences in the display effect.

It will be noted that the present disclosure does not limit the screen resolution of the display device, as long as the display device may achieve a normal display function. In some examples, the screen resolution of the display device is 1200×1200, the first resolution is 800×800, and the second resolution is 600×600. It will be understood that, the screen resolution of the display device is 1200×1200, which means that the number of horizontal pixels in the screen resolution is 1200, and the number of vertical pixels in the screen resolution is 1200; the first resolution is 800×800, which means that the number of horizontal pixels in the first resolution is 800, and the number of vertical pixels in the first resolution is 800; the second resolution is 600×600, which means that the number of horizontal pixels in the second resolution is 600, and the number of vertical pixels in the second resolution is 600. In addition, a person skilled in the art should understand that the above is only described by taking an example in which the number of horizontal pixels and the number of vertical pixels in each resolution are equal. In other examples, the number of horizontal pixels and the number of vertical pixels in each resolution may be unequal.

Figure 5:
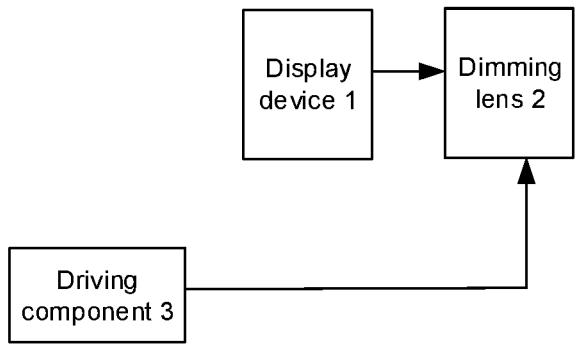
FIG. 5 is a block diagram showing a structure of an imaging system, in accordance with some embodiments of the present disclosure.

FIG. 5 is a block diagram showing a structure of an imaging system in some embodiments of the present disclosure. In some embodiments, as shown in FIG. 5, the imaging system not only includes the display device 1 and the dimming lens 2 described above, but also includes a driving component 3. In this case, the driving component 3 is connected to the dimming lens, and the driving component 3 is configured to drive the dimming lens 2 to move toward or away from the display device 1.

Figure 6:
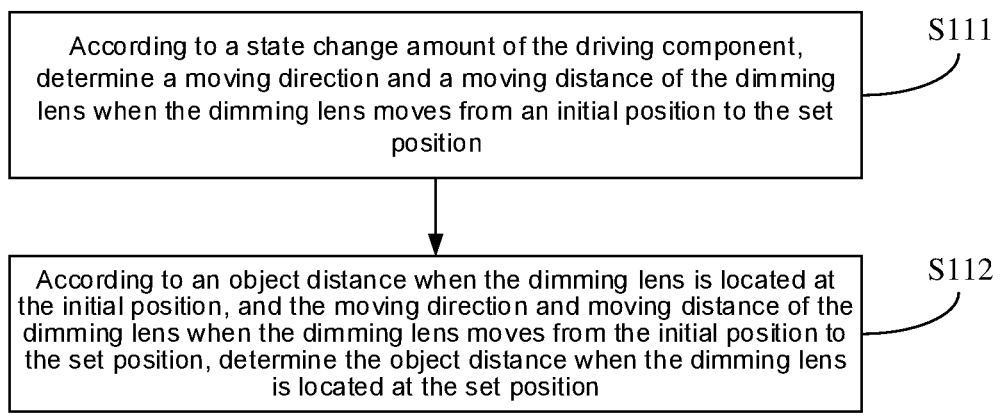
FIG. 6 is a flow diagram of yet another control method for an imaging system, in accordance with some embodiments of the present disclosure.

Based on this, as shown in FIG. 6, S11 includes S111 and S112.

In S111, according to a state change amount of the driving component 3, a moving direction and a moving distance of the dimming lens 2 when the dimming lens 2 moves from an initial position to the set position are determined. The initial position may be any position within a movable range of the dimming lens, which is not limited in the present disclosure. For example, a position within the movable range farthest from the display device 1 may serve as the initial position; for another example, a position within the movable range closest to the display device 1 may serve as the initial position; for yet another example, a middle position within the movable range may serve as the initial position.

In some examples, the driving component 3 includes a driving shaft (e.g., a motor shaft). In this case, the state change amount of the driving component 3 refers to a rotation direction and the number of rotations of the driving shaft. For example, in a case where the driving shaft rotates three times in a forward direction and two times in a reverse direction, it means that the driving shaft rotates only one time in the forward direction. In this case, it may mean that the dimming lens 2 moves a first distance toward the display device 1 (the first distance is determined by a transmission component between the driving shaft and the dimming lens 2), or it may mean that the dimming lens 2 moves the first distance away from the display device 1. The dimming lens 2 moves a distance that is an integer multiple of circumference of the driving shaft toward the display device 1. Correspondingly, if the driving shaft rotates two times in the forward direction, it means that the dimming lens 2 moves two first distances toward or away from the display device 1.

In S112, according to an object distance when the dimming lens 2 is located at the initial position, and the moving direction and moving distance when the dimming lens 2 moves from the initial position to the set position, the object distance when the dimming lens 2 is located at the set position is determined. Since the initial position of the dimming lens 2 is preset, the object distance when the dimming lens 2 is located at the initial position is also known.

On this basis, combined with the moving direction and moving distance when the dimming lens 2 moves from the initial position to the set position, the object distance when the dimming lens 2 is located at the set position may be determined. For example, in a case where the object distance when the dimming lens 2 is at the initial position is 5 mm, and the dimming lens 2 moves 3 mm toward the display device 1 during the period when the dimming lens 2 moves from the initial position to the set position, the determined object distance when the dimming lens 2 is located at the set position is 2 mm.

Figure 7:
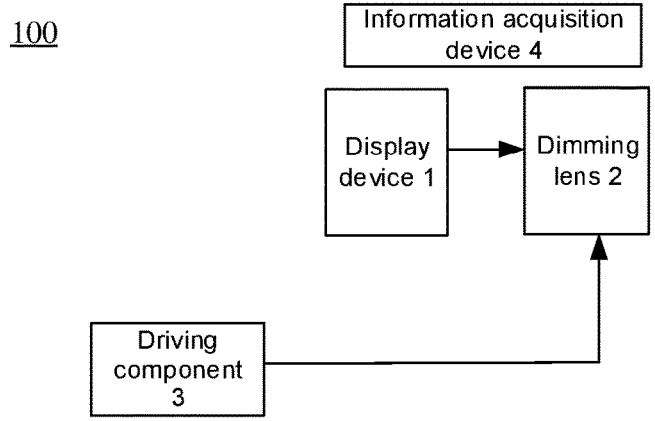
FIG. 7 is a block diagram showing a structure of another imaging system, in accordance with some embodiments of the present disclosure.

FIG. 7A is a block diagram showing a structure of another imaging system in some embodiments of the present disclosure. As shown in FIG. 7, the imaging system 100 not only includes the display device 1, the dimming lens 2 and the driving component 3 described above, but also includes an information acquisition device 4.

Figure 8:
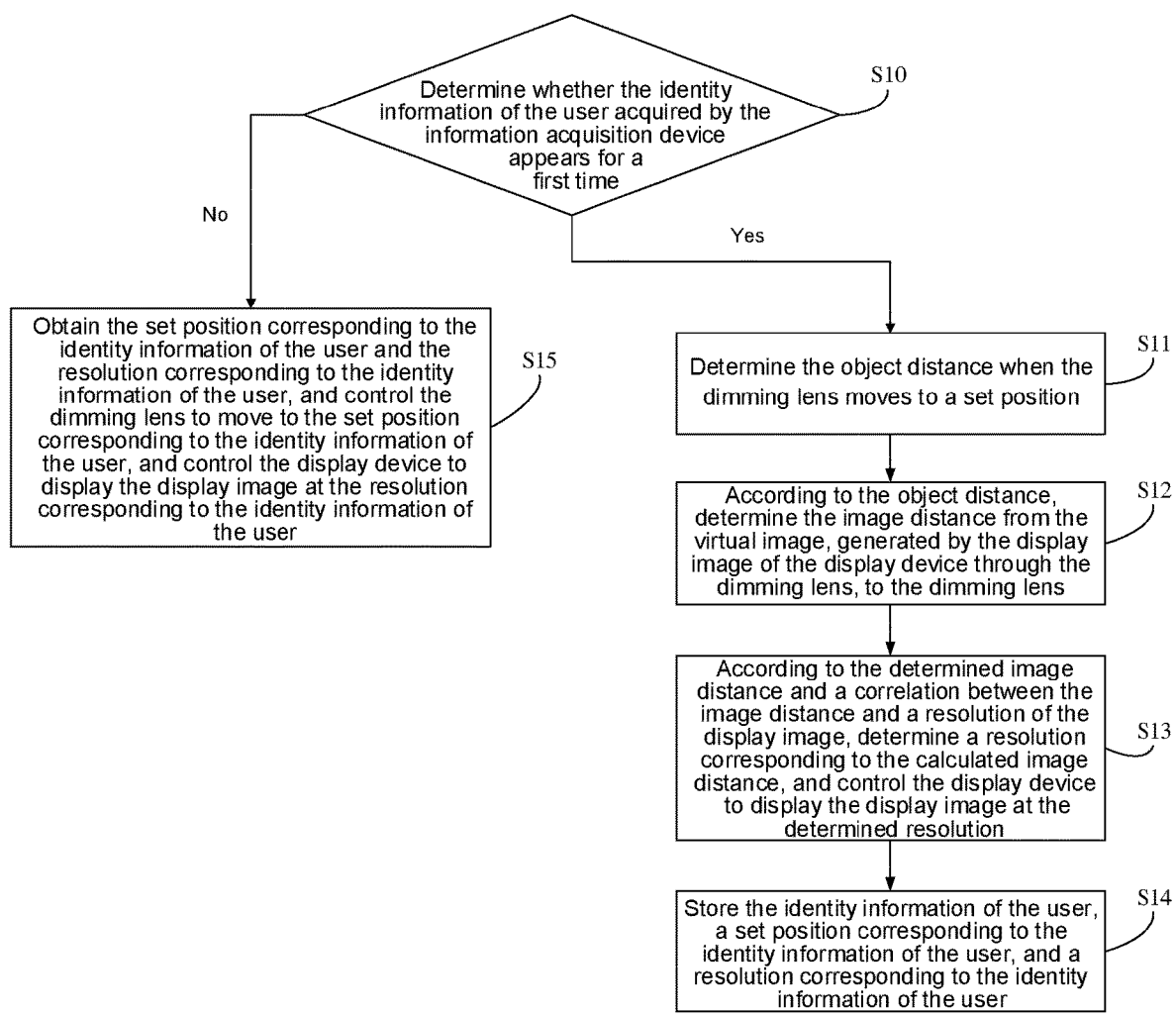
FIG. 8 is a flow diagram of yet another control method for an imaging system, in accordance with some embodiments of the present disclosure.

The information acquisition device is configured to acquire identity information of a user. The identity information of the user may be at least one of biological information such as iris information or fingerprint information, or at least one of encoded information such as identity card number, mobile phone number, two-dimensional code or barcode. Based on this, for example, as shown in FIG. 8, the control method for the imaging system further includes S10, S14 and S15.

In S10, it is determined whether the acquired identity information of the user appears for a first time.

In S14, if the acquired identity information of the user appears for the first time, the identity information of the user, a set position corresponding to the identity information of the user and a resolution corresponding to the identity information of the user are stored.

In S15, if the acquired identity information of the user does not appear for the first time, the set position corresponding to the identity information of the user and the resolution corresponding to the identity information of the user are obtained, and the dimming lens is controlled to move to the set position corresponding to the identity information of the user, and the display device is controlled to display the display image at the resolution corresponding to the identity information of user.

In the embodiments, when the user uses the imaging system for the first time, identity information of the user, the set position corresponding to the identity information of the user and the resolution corresponding to the identity information of the user may be stored. In this way, when the same user uses the imaging system for the second time and each time thereafter, the set position corresponding to the identity information of the user and the resolution corresponding to the identity information of the user may be directly called, and then the dimming lens is directly driven by the driving component to move to the set position corresponding to the identity information of the user, and the display device is controlled to display the display image at the resolution corresponding to the identity information of the user. As a result, the operation is simple and convenient.

The foregoing mainly introduces the solutions provided by some embodiments of the present disclosure through the method examples. Based on this, some embodiments of the present disclosure provide a control device of an imaging system. In order to achieve the above functions, the control device may include corresponding hardware structures and/or software modules for performing various functions. A person skilled in the art will be easy to realize that by combining method steps of the examples described in the embodiments disclosed herein, the present disclosure may be implemented through hardware or a combination of the hardware and computer software. Whether a certain function is performed by the hardware or a way of driving the hardware by the computer software depends on a specific application and a design constraint of a technical scheme. A skilled person may use different methods for each specific application to implement the described functions, but such implementation should not be considered beyond the scope of the present disclosure.

Functional modules of the control device provided by the embodiments of the present disclosure may be divided based on the above embodiments of method. For example, each function may be divided into one functional module, or two or more functions may be integrated into one processing module. The above integrated module may be implemented in the form of the hardware or in a form of a software functional module. It will be noted that the division of the functional modules in some embodiments of the present disclosure is schematic, and is only a logical functional division, and there may be other manners to divide the functional modules in practical implementations.

Figure 9A:
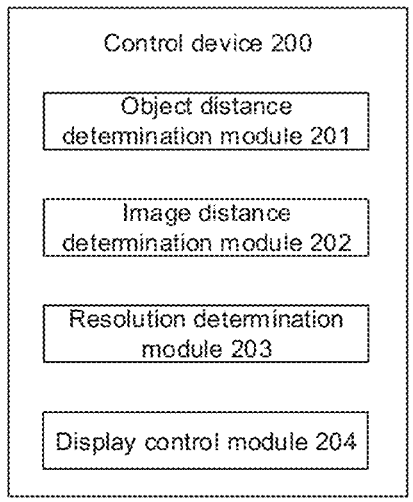
FIG. 9A is a block diagram showing a structure of a control device of an imaging system, in accordance with some embodiments of the present disclosure.

In a case where each functional module is divided corresponding to each function, FIG. 9A is a schematic diagram showing a possible structure of the control device involved in the above embodiments. As shown in FIG. 9A, the control device 200 includes an object distance determination module 201, an image distance determination module 202, a resolution determination module 203 and a display control module 204. The object distance determination module 201 is used to support the control device 200 to perform S11 in FIG. 2, S111 and S112 in FIG. 6, and S11 in FIG. 8; the image distance determination module 202 is used to support the control device 200 to perform S12 in FIG. 2, and S12 in FIG. 8; the resolution determination module 203 and the display control module 204 are used to support the control device 200 to perform S13 in FIG. 2, S131 and S132 in FIG. 3, S133 and S134 in FIG. 4, and S13 in FIG. 8. All relevant content of the steps involved in the above method embodiments may be cited in a functional description of a corresponding functional module, which will not be repeated herein.

Figure 9B:
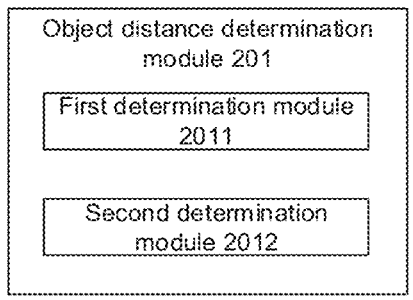
FIG. 9B is a block diagram showing a structure of another control device of an imaging system, in accordance with some embodiments of the present disclosure.

Based on this, in a case where the imaging system 100 further includes the driving component 3 shown in FIG. 5, as shown in FIG. 9B, the object distance determination module 201 may be further divided into a first determination module 2011 and a second determination module 2012. The first determination module 2011 is used to support the control device 200 to perform S111 in FIG. 6, and the second determination module 2012 is used to support the control device 200 to perform S112 in FIG. 6.

Figure 9C:
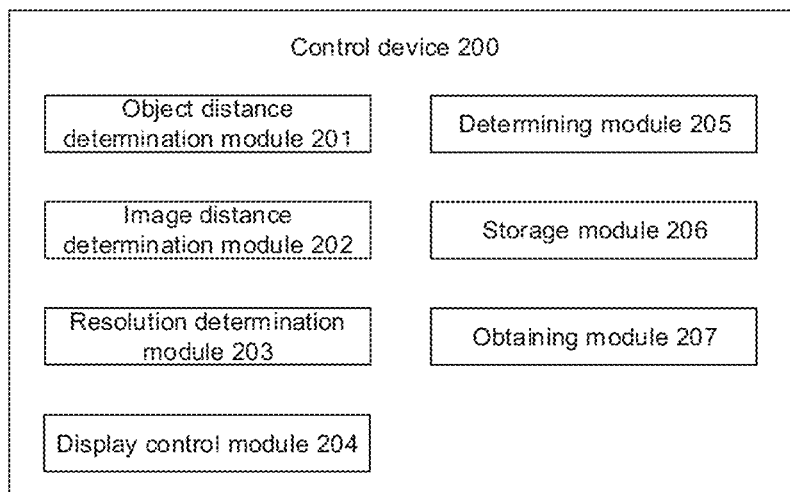
FIG. 9C is a block diagram showing a structure of yet another control device of an imaging system, in accordance with some embodiments of the present disclosure.

In a case where the imaging system 100 further includes the information acquisition device 4 shown in FIG. 7, as shown in FIG. 9C, the control device 200 may further include a determining module 205, a storage module 206 and an obtaining module 207. The determining module 205 is used to support the control device 200 to perform S10 in FIG. 8; the storage module 206 is used to support the control device 200 to perform S14 in FIG. 8; the obtaining module 207 and the display control module 204 are used to support the control device 200 to perform S15 in FIG. 8.

Figure 10A:
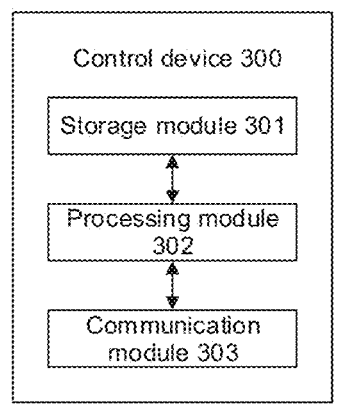
FIG. 10A is a block diagram showing a structure of yet another control device of an imaging system, in accordance with some embodiments of the present disclosure.

In a case of using an integrated control device, FIG. 10A is a schematic diagram showing a possible structure of the control device involved in the above embodiments. The control device 300 includes a processing module 302 and a communication module 303. The processing module 302 is used to control actions of the control device 300. For example, the processing module 302 is used to support the control device 300 to perform S11 to S13 in FIG. 2, S131 and S132 in FIG. 3, S133 and S134 in FIG. 4, S111 and S112 in FIG. 6, S10 to S13 and S15 in FIG. 8, and/or other processes for the techniques described herein. The communication module 303 is used to support communication between base stations and other network entities, for example, communication with the functional modules shown in FIG. 9A, FIG. 9B, and FIG. 9C or network entities. For example, as shown in FIG. 10A, the control device 300 may further include a storage module 301 for storing program codes and data of the base stations. Meanwhile, in some examples, the storage module 301 may be used to perform S14 in FIG. 8.

The processing module 302 may be a processor or a controller, for example, a central processing unit (CPU), a general-purpose processor, a digital signal processor (DSP), an application-specific integrated circuit (ASIC), a field programmable gate array (FPGA), or other programmable logic devices, transistor logic devices, hardware components, or any combination thereof. It may implement or execute various illustrative logical blocks, modules and circuits described in conjunction with the description of the present disclosure. The processor may be a combination which implements computing functions, such as a combination including one or more microprocessors, or a combination of a DSP and a microprocessor. The communication module 303 may be a transceiver, a transceiver circuit, a communication interface, or the like. The storage module 301 may be a memory.

Figure 10B:
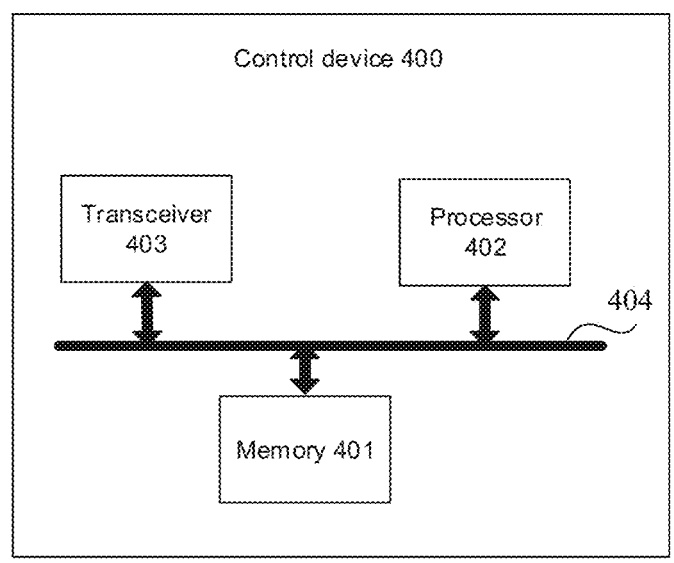
FIG. 10B is a block diagram showing a structure of yet another control device of an imaging system, in accordance with some embodiments of the present disclosure.

In a case where the processing module 302 is the processor, the communication module 1303 is the transceiver, and the storage module 1301 is the memory, the control device involved in the embodiments of the present application may be the control device 400 shown in FIG. 10B.

Referring to FIG. 10B, the control device 400 includes a processor 402, a transceiver 403, a memory 401 and a bus 404. The transceiver 403, the processor 402, and the memory 401 are connected to one another through the bus 404; and the bus 404 may be a peripheral component interconnect (PCI) bus, an extended industry standard architecture (EISA) bus, or the like. The bus may be divided into an address bus, a data bus, a control bus, etc. For convenience of representation, in FIG. 10B, only one thick line is used to represent the bus, but it does not mean that there is only one bus or one type of bus.

Figure 11A:
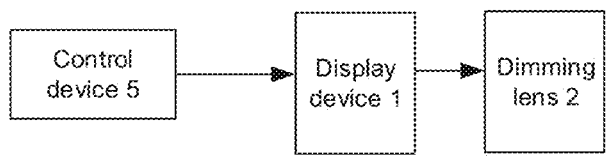
FIG. 11A is a block diagram showing a structure of yet another imaging system, in accordance with some embodiments of the present disclosure.
Figure 11B:
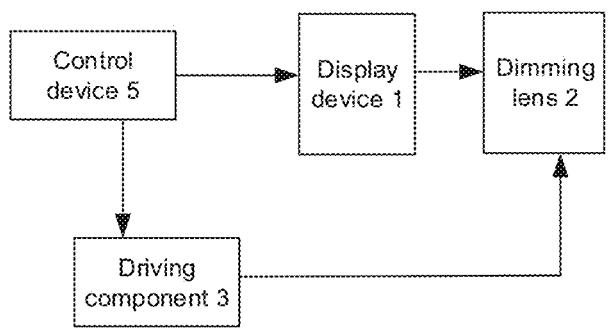
FIG. 11B is a block diagram showing a structure of yet another imaging system, in accordance with some embodiments of the present disclosure.
Figure 11C:
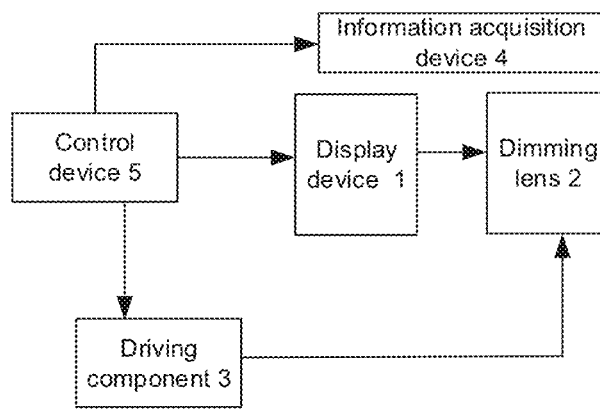
FIG. 11C is a block diagram showing a structure of yet another imaging system, in accordance with some embodiments of the present disclosure.

Based on the foregoing, some embodiments of the present disclosure provide an imaging system 100 as shown in FIGS. 11A to 11C. As shown in FIG. 11A, the imaging system 100 includes a display device 1, a dimming lens 2 disposed on the display side of the display device 1 and a control device 5. The dimming lens 2 may move toward or away from the display device 1 to adjust the object distance from the display device 1 to the dimming lens 2. The control device 5 may be the control device (e.g., the control device 200 shown in FIG. 9A, the control device 200 shown in FIG. 9C, the control device 300 shown in FIG. 10A, or the control device 400 shown in FIG. 10B) of the imaging system described in any of the above embodiments. Therefore, in some examples, the control device 5 may include at least the object distance determination module, the image distance determination module, the resolution determination module and the display control module as described above.

As shown in FIG. 11B, on the basis of the imaging system 100 shown in FIG. 11A, the imaging system 100 may further include a driving component 3. In this case, the control device 5 in the imaging system 100 may further include the first determination module and the second determination module as described above.

As shown in FIG. 11C, on the basis of the imaging system 100 shown in FIG. 11B, the imaging system 100 may further include an information acquisition device 4. In this case, the control device 5 in the imaging system 100 may further include the determining module, the storage module, the obtaining module, and the display control module as described above.

Beneficial effects of the imaging system 100 shown in FIGS. 11A to 11C in this embodiment are the same as those of the control method for the imaging system described in some of the above embodiments, which will not be repeated herein.

Figure 11D:
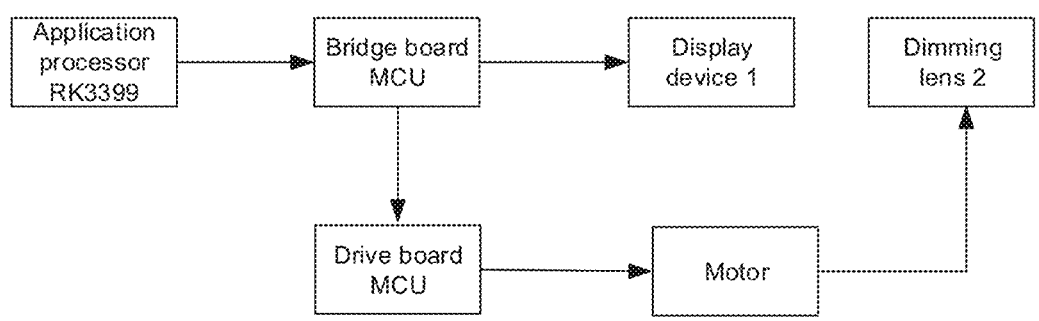
FIG. 11D is a diagram showing a hardware structure of a VR vision correction device, in accordance with some embodiments of the present disclosure.

The imaging system 100 may be the VR all-in-one machine, the VR vision correction device, the VR glasses, or the like. For example, FIG. 11D is a diagram showing a hardware structure of the VR vision correction device. As shown in FIG. 11D, the VR vision correction device includes an application processor RK3399, a bridge board microcontroller unit (MCU), a drive board MCU, a motor, the display device 1 and the dimming lens 2. The application processor RK3399 is connected to the bridge board MCU; for example, the application processor RK3399 may be connected to the bridge board MCU through a Type C interface, and the Type C includes two protocols of DP and USB 2.0. The bridge board MCU is connected to the display device 1; for example, the bridge board MCU may be connected to the display device 1 through a mobile industry processor interface (MIPI). In this way, the control of the display device 1 is achieved. On this basis, the bridge board MCU may further be connected to the drive board MCU; for example, the driver board MCU may be controlled through a USB interface, and then the motor may be controlled to rotate through the drive board MCU, so as to adjust the position of the dimming lens 2, that is, adjustment of the image distance may be achieved.

It is worth pointing out that, for the VR vision correction device with the application processor RK3399, after testing, it is found that in a case where the method is not performed, the power consumption of the whole machine running the training application is 7.472 w, and the service time is about 1.5 hours; in a case where the method is performed, the power consumption of the whole machine running the training application is reduced by more than half, and the running time is increased by more than 150%.

In addition, it will be noted that the steps of the method or algorithm described in conjunction with the embodiments of the present disclosure may be implemented in a hardware manner, or may be implemented in a manner in which a processor executes software instructions. The software instructions may be composed of corresponding software modules, and the software modules may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disk read-only memory (CD-ROM), or any other form of storage medium known in the art. An exemplary storage medium is coupled to the processor to enable the processor to read information from the storage medium and write information to the storage medium. Of course, the storage medium may also be an integral part of the processor.

A person skilled in the art will realize that in one or more of the examples described above, the functions described in the embodiments of the present disclosure may be implemented by using a hardware, a software, a firmware, or any combination thereof. When implemented by software, the functions may be stored in or transmitted over as one or more instructions or code in a computer-readable medium. The computer-readable medium includes a computer storage medium and a communication medium, and the communication medium includes any medium that facilitates transfer of a computer program from one place to another. The storage medium may be any available medium that may be accessed by a general-purpose or special-purpose computer.

Based on this, some embodiments of the present disclosure provide a computer-readable storage medium (e.g., a non-transitory computer-readable storage medium). The computer-readable storage medium stores computer program instructions that, when executed on a processor, cause the processor to perform one or more steps in the control method for the imaging system as described in any one of the above embodiments.

Some embodiments of the present disclosure provide a computer program product. The computer program product includes computer program instructions that, when executed on a computer, cause the computer to perform one or more steps in the control method for the imaging system as described in the above embodiments.

Some embodiments of the present disclosure provide a computer program. When the computer program is executed on the computer, the computer program causes the computer to perform one or more steps in the control method for the imaging system as described in the above embodiments.

The computer-readable storage medium, the computer program product and the computer program have the same beneficial effects as the control method for the imaging system as described in some embodiments, which will be not described herein again.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A control method for an imaging system, wherein the imaging system includes a display device and a dimming lens disposed on a display side of the display device, the dimming lens is capable of moving toward or away from the display device to adjust an object distance from the display device to the dimming lens;

the method comprises:
determining the object distance when the dimming lens moves to a set position;
according to the object distance, determining an image distance from a virtual image, generated by a display image of the display device through the dimming lens, to the dimming lens; and
according to the determined image distance and a correlation between the image distance and a resolution of the display image, determining a resolution corresponding to the determined image distance; and
controlling the display device to display the display image at the determined resolution;
wherein according to the determined image distance and the correlation between the image distance and the resolution of the display image, determining the resolution corresponding to the determined image distance, includes:
if the determined image distance is within a first image distance range, determining that the resolution corresponding to the determined image distance is equal to a screen resolution of the display device; and
if the determined image distance is within a second image distance range, determining that the resolution corresponding to the determined image distance is smaller than the screen resolution of the display device;
wherein each image distance value in the second image distance range is greater than each image distance value in the first image distance range;
wherein the second image distance range includes a third image distance range and a fourth image distance range; according to the determined image distance and the correlation between the image distance and the resolution of the display image, determining the resolution corresponding to the determined image distance, further includes:
if the determined image distance is within the third image distance range, determining that the resolution corresponding to the determined image distance is a first resolution; and
if the determined image distance is within the fourth image distance range, determining that the resolution corresponding to the determined image distance is a second resolution;
wherein each image distance value in the fourth image distance range is greater than each image distance value in the third image distance range; the first resolution is smaller than the screen resolution of the display device and larger than the second resolution; a number of horizontal pixels of the second resolution is 0.5 times a number of horizontal pixels of the screen resolution of the display device, and a number of vertical pixels of the second resolution is 0.5 times a number of vertical pixels of the screen resolution of the display device.

2. The control method according to claim 1, wherein the image distance has a negative correlation with the resolution of the display image.

3. The control method according to claim 1, wherein each image distance value in the first image distance range is greater than or equal to 0.1 meters and less than or equal to 3 meters.

4. The control method according to claim 1, wherein
each image distance value in the third image distance range is greater than 3 meters and less than or equal to 6 meters; each image distance value in the fourth image distance range is greater than 6 meters and less than or equal to 10 meters.

5. The control method according to claim 1, wherein
the screen resolution of the display device is 1200×1200; the first resolution is 800×800; the second resolution is 600×600.

6. The control method according to claim 1, wherein the imaging system further includes a driving component connected to the dimming lens, the driving component is configured to drive the dimming lens to move toward or away from the display device; determining the object distance when the dimming lens moves to the set position, includes:
according to a state change amount of the driving component, determining a moving direction and a moving distance of the dimming lens when the dimming lens moves from an initial position to the set position; and
according to an object distance when the dimming lens is located at the initial position, and the moving direction and the moving distance of the dimming lens when the dimming lens moves from the initial position to the set position, determining the object distance when the dimming lens is located at the set position.

7. The control method according to claim 6, wherein the driving component includes a driving shaft; the state change amount of the driving component includes a rotation direction and a number of rotations of the driving shaft.

8. The control method according to claim 1, wherein the imaging system further includes an information acquisition device, the information acquisition device is configured to acquire identity information of a user; the control method further comprises:
determining whether the identity information of the user acquired by the information acquisition device appears for a first time; and
if the acquired identity information of the user appears for the first time, storing the identity information of the user, a set position corresponding to the identity information of the user, and a resolution corresponding to the identity information of the user.

9. The control method according to claim 8, wherein
if the acquired identity information of the user does not appear for the first time, obtaining the set position corresponding to the identity information of the user and the resolution corresponding to the identity information of the user;
controlling the dimming lens to move to the set position corresponding to the identity information of the user; and
controlling the display device to display the display image at the resolution corresponding to the identity information of the user.

10. A non-transitory computer-readable storage medium, the computer-readable storage medium storing computer program instructions that, when executed on a processor, cause the processor to perform one or more steps of the control method for the imaging system according to claim 1.

11. A computer program product, comprising computer program instructions that, when executed on a computer, cause the computer to perform one or more steps of the control method for the imaging system according to claim 1.

12. The control method according to any one of claim 1, wherein according to the object distance, determining the image distance from the virtual image, generated by the display image of the display device through the dimming lens, to the dimming lens, includes:
determining the image distance according to following formula:

$$\frac{1}{a} - \frac{1}{b} = \frac{1}{f};$$

wherein a is the object distance, b is the image distance, f is a focal distance of the dimming lens, and a is less than f.

13. The control method according to claim 3, wherein the second image distance range includes a third image distance range and a fourth image distance range; according to the determined image distance and the correlation between the image distance and the resolution of the display image, determining the resolution corresponding to the determined image distance, further includes:
if the determined image distance is within the third image distance range, determining that the resolution corresponding to the determined image distance is a first resolution; and
if the determined image distance is within the fourth image distance range, determining that the resolution corresponding to the determined image distance is a second resolution;
wherein each image distance value in the fourth image distance range is greater than each image distance value in the third image distance range; the first resolution is smaller than the screen resolution of the display device and larger than the second resolution; a number of horizontal pixels of the second resolution is 0.5 times a number of horizontal pixels of the screen resolution of the display device, and a number of vertical pixels of the second resolution is 0.5 times a number of vertical pixels of the screen resolution of the display device.

14. The control method according to claim 4, wherein
the screen resolution of the display device is 1200×1200; the first resolution is 800×800; the second resolution is 600×600.

15. An imaging system, comprising:
a display device;
a dimming lens disposed on a display side of the display device, the dimming lens being capable of moving toward or away from the display device to adjust an object distance from the display device to the dimming lens; and
a control device; wherein the control device is configured to: determine the object distance when the dimming lens moves to a set position; according to the object distance, determine an image distance from a virtual image, generated by a display image of the display device through the dimming lens, to the dimming lens; according to the determined image distance and a correlation between the image distance and a resolution of the display image, determine a resolution corresponding to the determined image distance; and control the display device to display the display image at the determined resolution;
wherein that the control device is configured to determine the resolution corresponding to the determined image distance according to the determined image distance and the correlation between the image distance and the resolution of the display image, includes:

if the determined image distance is within a first image distance range, determining that the resolution corresponding to the determined image distance is equal to a screen resolution of the display device; and if the determined image distance is within a second image distance range, determining that the resolution corresponding to the determined image distance is smaller than the screen resolution of the display device;

wherein each image distance value in the second image distance range is greater than each image distance value in the first image distance range;

wherein the second image distance range includes a third image distance range and a fourth image distance range; according to the determined image distance and the correlation between the image distance and the resolution of the display image, determining the resolution corresponding to the determined image distance, further includes:

if the determined image distance is within the third image distance range, determining that the resolution corresponding to the determined image distance is a first resolution; and if the determined image distance is within the fourth image distance range, determining that the resolution corresponding to the determined image distance is a second resolution;

wherein each image distance value in the fourth image distance range is greater than each image distance value in the third image distance range; the first resolution is smaller than the screen resolution of the display device and larger than the second resolution; a number of horizontal pixels of the second resolution is 0.5 times a number of horizontal pixels of the screen resolution of the display device, and a number of vertical pixels of the second resolution is 0.5 times a number of vertical pixels of the screen resolution of the display device.

16. The imaging system according to claim 15, further comprising:

a driving component connected to the dimming lens, the driving component being configured to drive the dimming lens to move toward or away from the display device;

wherein the control device is further configured to:

determine a moving direction and a moving distance of the dimming lens when the dimming lens moves from an initial position to the set position, according to a state change amount of the driving component; and determine the object distance when the dimming lens is located at the set position, according to an object distance when the dimming lens is located at the initial position and the moving direction and the moving distance of the dimming lens when the dimming lens moves from the initial position to the set position.

17. The imaging system according to claim 15, further comprising:

an information acquisition device configured to acquire identity information of a user;

wherein the control device is further configured to determine whether the acquired identity information of the user appears for a first time;

if the acquired identity information of the user appears for the first time, the control device is further configured to store the identity information of the user, a set position corresponding to the identity information of the user, and a resolution corresponding to the identity information of the user; and if the acquired identity information of the user does not appear for the first time, the control device is further configured to: obtain the set position corresponding to the identity information of the user and the resolution corresponding to the identity information of the user; control the dimming lens to move to the set position corresponding to the identity information of the user; and control the display device to display the display image at the resolution corresponding to the identity information of the user.

18. The imaging system according to claim 15, wherein the imaging system is a virtual reality (VR) all-in-one machine, a VR vision correction device or VR glasses.

* * * * *